Nov. 3, 1936.  L. W. G. FLYNT  2,059,572

BEVERAGE MIXING APPARATUS

Filed Aug. 22, 1934  5 Sheets-Sheet 1

Louis W. G. Flynt
INVENTOR.

BY C. C. Cousins.
ATTORNEY.

Nov. 3, 1936.  L. W. G. FLYNT  2,059,572
BEVERAGE MIXING APPARATUS
Filed Aug. 22, 1934  5 Sheets-Sheet 2

Louis W. G. Flynt
INVENTOR.
BY C. C. Cousino
ATTORNEY.

Nov. 3, 1936. L. W. G. FLYNT 2,059,572
BEVERAGE MIXING APPARATUS
Filed Aug. 22, 1934 5 Sheets-Sheet 3
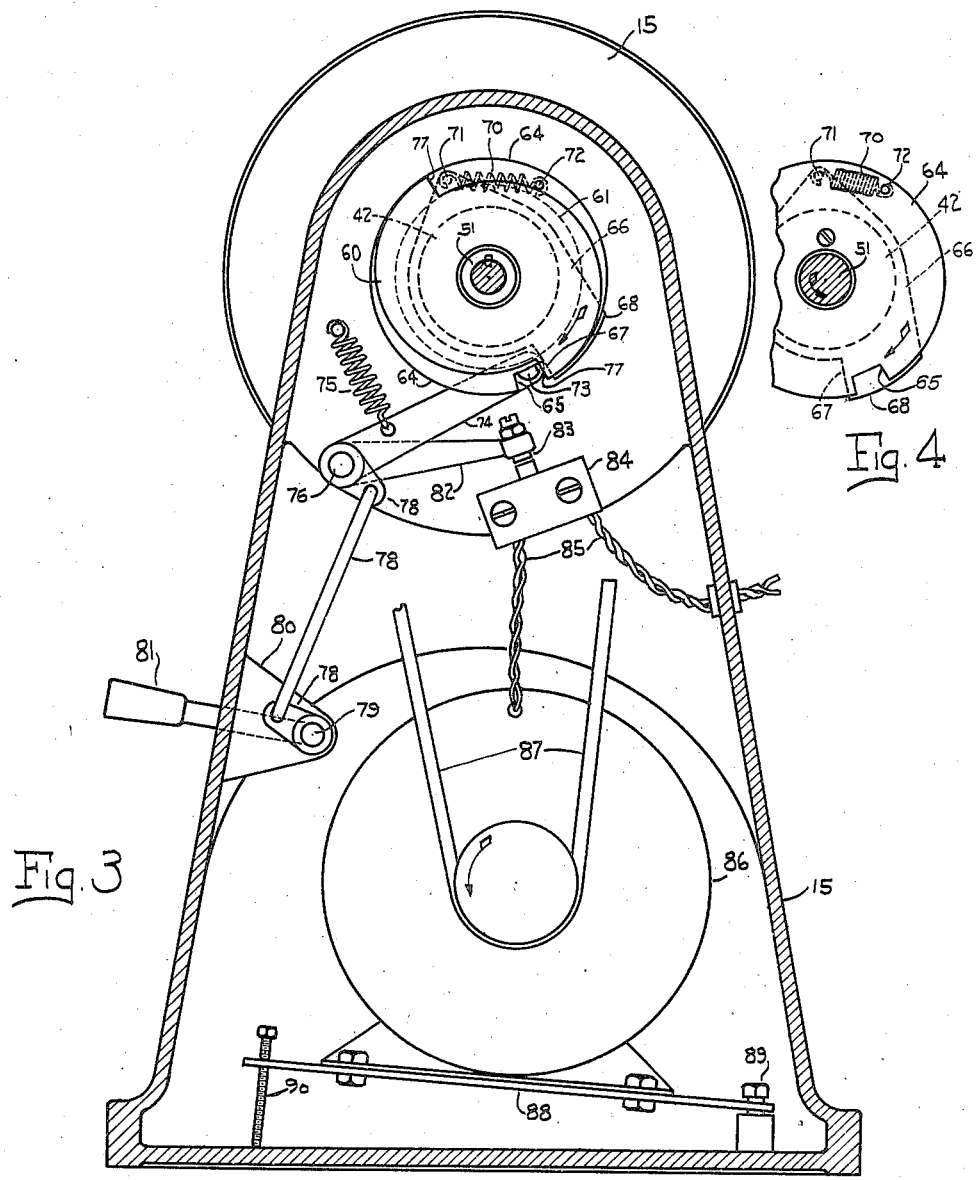
Louis W. G. Flynt
INVENTOR.
BY C. C. Cousins
ATTORNEY.

Nov. 3, 1936.  L. W. G. FLYNT  2,059,572
BEVERAGE MIXING APPARATUS
Filed Aug. 22, 1934   5 Sheets-Sheet 4
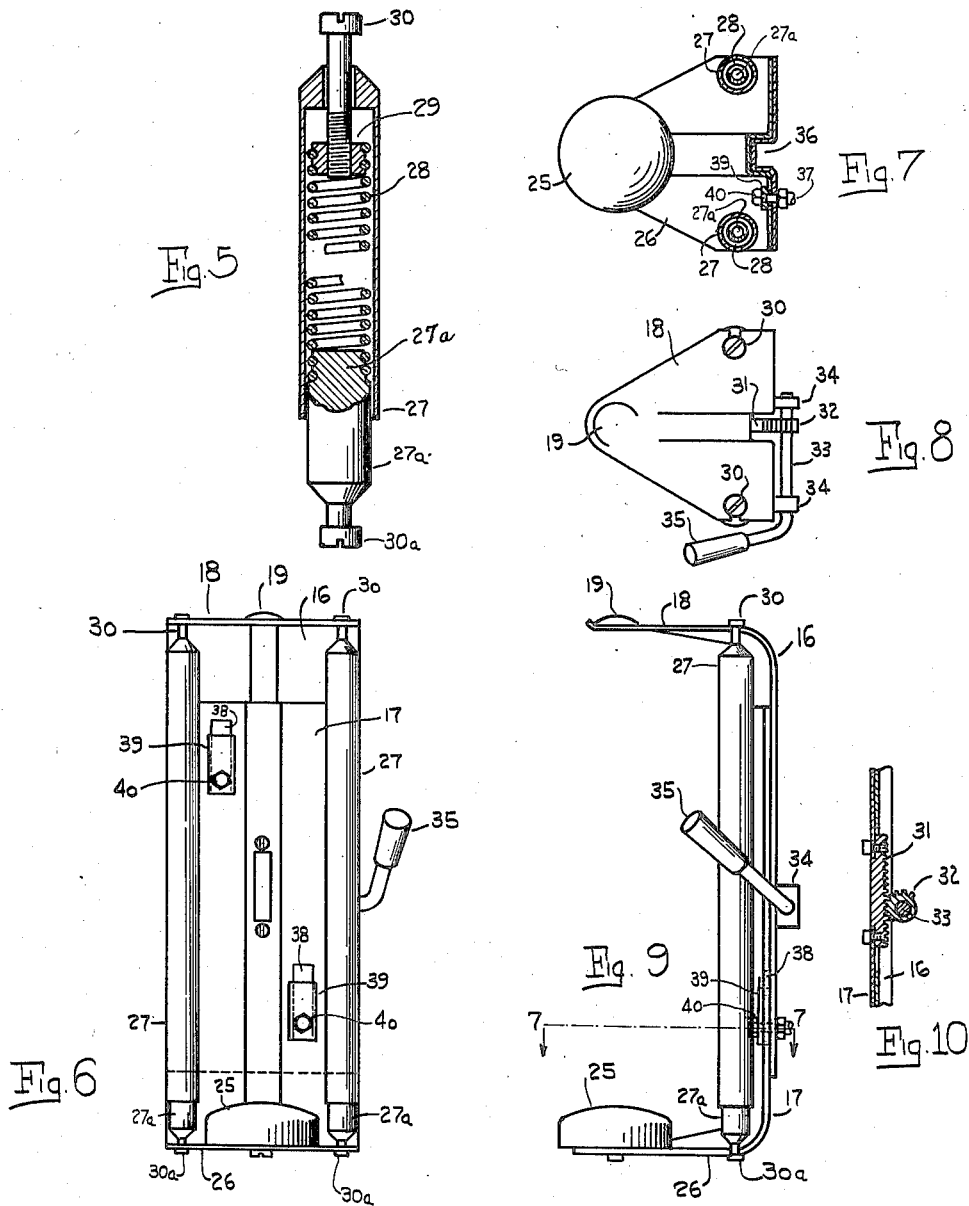
Louis W.G. Flynt
INVENTOR.
BY C.C.Cousins
ATTORNEY.

Nov. 3, 1936.　　　L. W. G. FLYNT　　　2,059,572
BEVERAGE MIXING APPARATUS
Filed Aug. 22, 1934　　　5 Sheets-Sheet 5

Louis W. G. Flynt
INVENTOR.
BY C. C. Cousins
ATTORNEY.

Patented Nov. 3, 1936

2,059,572

UNITED STATES PATENT OFFICE 2,059,572

BEVERAGE MIXING APPARATUS

Louis W. G. Flynt, East Orange, N. J., assignor to Sefco, Inc., Newark, N. J.

Application August 22, 1934, Serial No. 740,860

12 Claims. (Cl. 259—72)

This invention relates to beverage mixing apparatus.

The broad object of the invention is to produce an apparatus which will thoroughly mix a beverage containing different ingredients of different characteristics, viscosities and specific gravities.

The invention is particularly useful in places where alcoholic beverages are dispensed. During the "cocktail hour" a large number of customers may require service and time is a vital factor in the preparation of mixed drinks. Therefore, a further object of the invention is to provide a mechanical means for mixing beverages so that the operator will be free to perform other duties while the beverage is being mixed. A further object is to provide means to thoroughly mix a beverage faster than the same could be thoroughly mixed by hand.

A further object of the invention is to provide means for thoroughly agitating a beverage by reciprocating a container and simultaneously turning the container in a vertical plane as distinguished from the mere stirring of the beverage by a rotating element.

A further object is to provide an efficient and quickly operable gripping means for a container in which the ingredients of the beverage to be mixed are placed.

A further object of the invention is to provide a mechanism for shaking such a container for beverages and the beverage contained therein and at the same time for rotating the container in a vertical plane so that it moves through a complete circle.

A further object of the invention is to provide a brake and stopping mechanism which will arrest the rotary shaking movement of such a container after it has been rotated through a complete circle.

A further object of the invention is to provide an assembly which will include the gripping mechanism, the mechanism for vibrating the container and rotating the same, a motor for operating the moving parts of the assembly and a clutch mechanism interposed between the motor and the agitating and rotating mechanism, and to provide means for automatically cutting off the power from the motor and applying a braking means so that the container may be stopped in its travel at a predetermined point after it has been rotated through a complete circle.

The invention consists of the construction, combination and arrangement of parts as herein illustrated, described and claimed.

In the accompanying drawings, forming part hereof, is illustrated a form of embodiment of the invention, in which drawings similar reference characters designate corresponding parts, and in which:

Figure 3 is a vertical section taken approximately on line 3—3 of Figure 2, looking in the direction indicated by the arrows;

Figure 4 is a fragmentary detail in vertical section, taken approximately on line 4—4 of Figure 2, looking in the direction indicated by the arrows;

Figure 5 is a fragmentary detail in vertical section, taken approximately centrally of one of the tension members for the gripping means;

Figure 6 is a front elevation of the container-gripping assembly;

Figure 7 is a horizontal section taken approximately on line 7—7 of Figure 9, looking downward;

Figure 8 is a plan view of the gripping means;

Figure 9 is a side elevation of the right-hand side of the container-gripping assembly shown in Figure 6;

Figure 10 is a fragmentary detail in side elevation of the tension-removing device for the gripping element, the handle therefor being removed;

Figure 1:
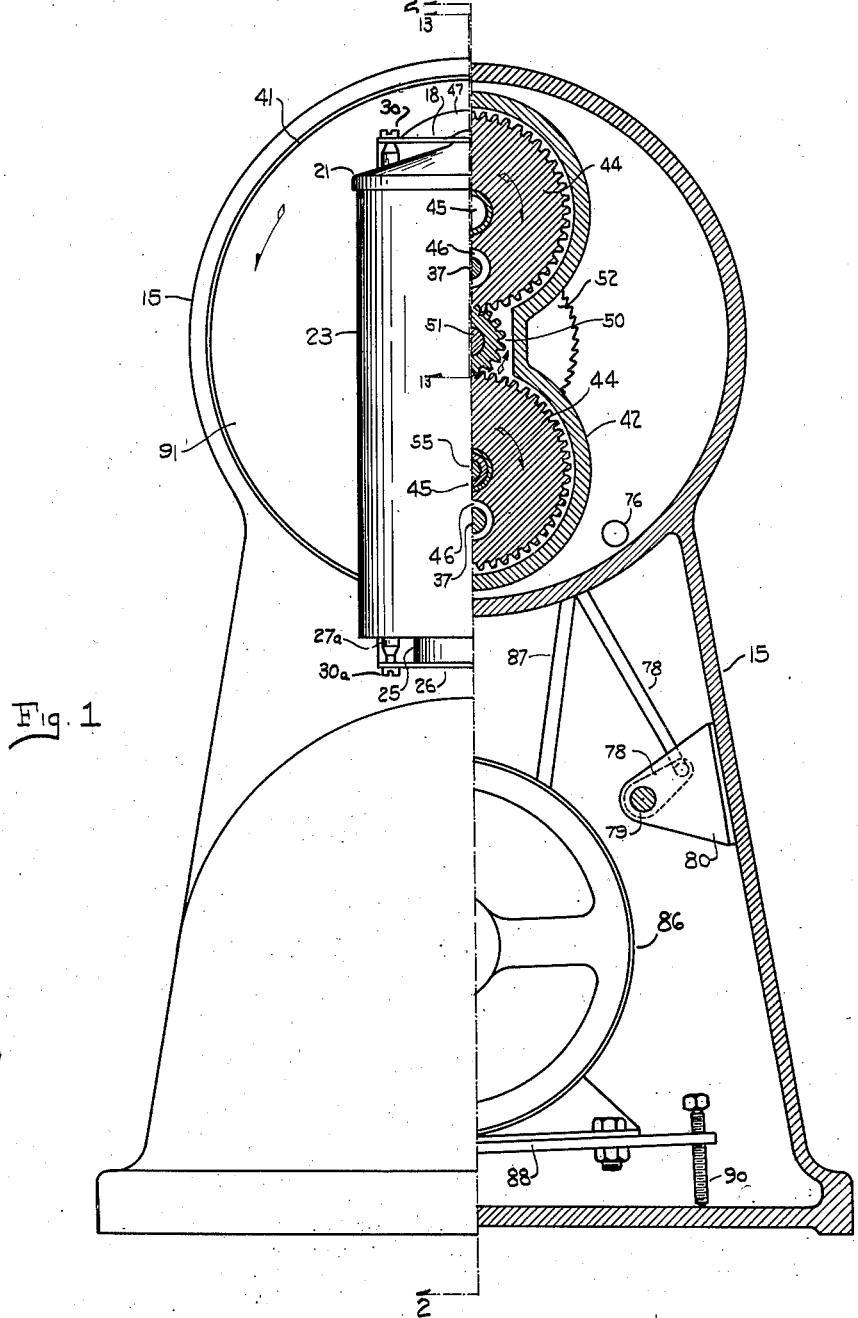
Figure 1 is a front elevation, partly in section, to show the interior construction.

Referring to the drawings, 15 designates generally a housing or casing in which is supported the agitating or shaking element of the invention and in which is disposed the power element and the movable parts driven thereby.

The gripping element as shown in detail in Figures 5 to 10 comprises a pair of complementary plates 16 and 17 maintained in slidable relation to each other. The plate 16 is provided with an angular extension 18 having a recessed seat 19 adapted to receive a boss 20 formed on a cover 21 which has an annular channel 22. A mixing container 23 is formed of any suitable material and of a configuration to closely fit into the annular channel 22. The container 23 is formed with a recessed seat 24 to receive a boss 25 formed on or secured to an angular extension 26 of the plate 17.

The plates 16 and 17 are normally maintained in position to receive the container 23 so that the latter is firmly gripped under a spring tension. This tension is maintained by a pair of helical springs 28 contained in tubular members 27, the upper ends of the springs 28 being secured to blocks 29. Telescopic members 27a are entered in the lower portions of the tubular members 27 and the lower ends of the springs 28 are secured to the telescopic members 27a. The tension of the springs 28 is adjusted by screws 30 through the blocks 29 which screws 30 also serve to connect the springs 28 with the plate 18. The telescopic members 27a are connected to the plates 26 by studs 30a. The tension of the springs 28 is so directed that the arms 18 and 26 are forced towards each other to firmly grip the container 23. To overcome the tension of the springs 28 the plate 17 has secured thereon a rack 31. Disposed to mesh with the rack 31 is a pinion 32 carried on a shaft 33, which shaft 33 is mounted in bearings 34 on the plate 16. The shaft 33 terminates in an operating handle 35. When the shaft 33 is rocked the pinion 32 carried by the plate 16 operates the rack 31 to separate the extensions 18 and 26 so that the tension of the springs 28 is overcome and the container 23 may be readily removed or inserted.

The plates 16 and 17 are maintained in their slidable relation by having formed therein complementary channels 36. The plate 16 is rigidly carried by two stub shafts 37. The plate 17 is slotted at 38 adjacent the shafts 37 to permit relative movement between the plates 16 and 17. Over the slots 38 are disposed offset plates or washers 39 to bear against the plate 16 and cover the slots 38. Nuts 40 are disposed on the ends of the shafts 37 to hold the washers 39 and the plates 16 and 17 securely on the shafts 37.

The front wall of the casing 15 is provided with a circular opening 41 in which is disposed a gear box 42 having a rearwardly extending hollow extension or quill 43. Disposed in the gear box or casing 42 are gears 44 operable around shafts 45. Each gear 44 carries a bearing 46 at a point removed from the center thereof. The bearings 46 carry the stub shafts 37 above referred to. A face plate 47 is provided on each gear 44 and is held in place by screws 48 and a screw 49 in one shaft 45. The gears 44 are driven by a common pinion 50 secured on a main drive shaft 51.

Figure 2:
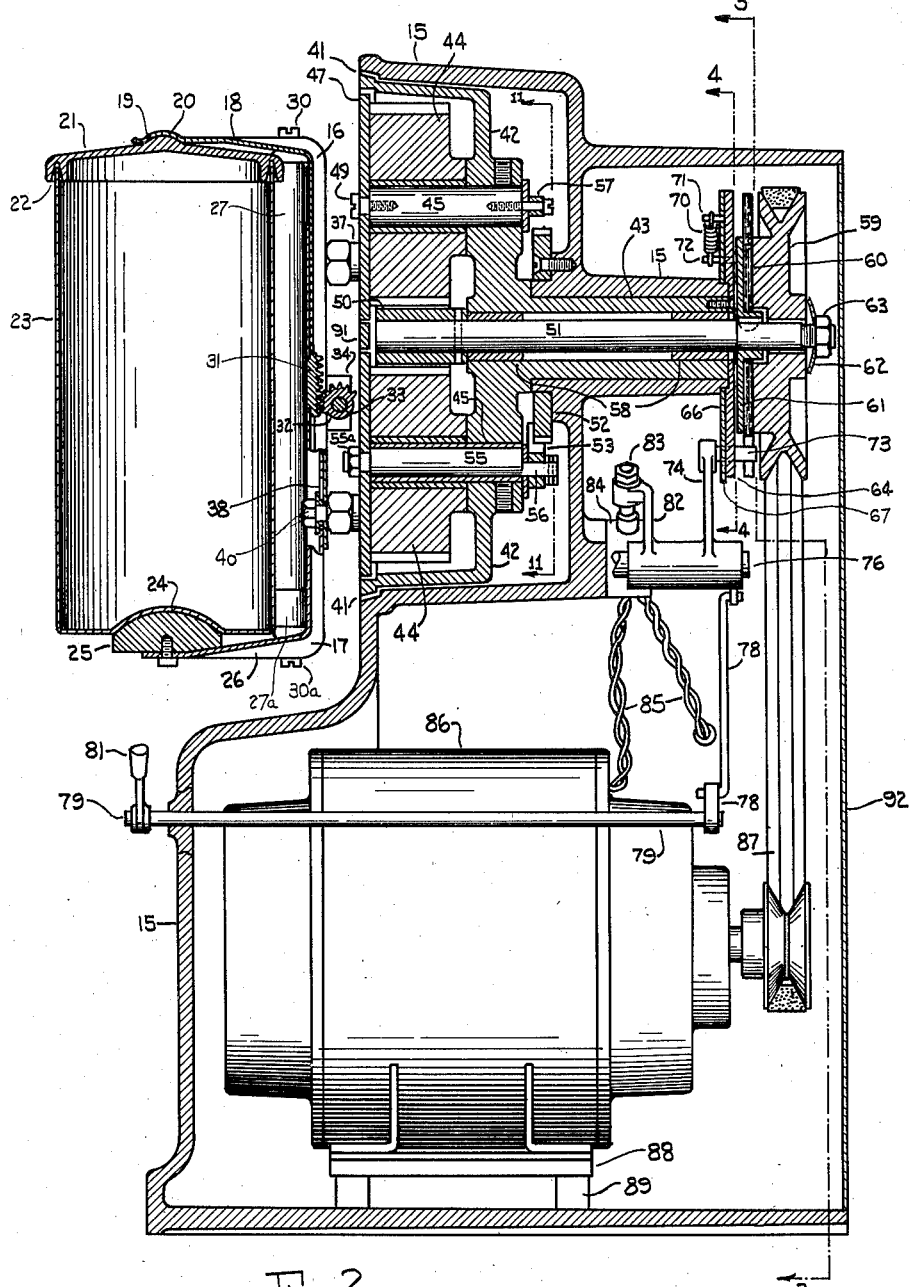
Figure 2 is a vertical section taken approximately on line 2—2 of Figure 1, looking in the direction indicated by the arrows, the lower portion of the construction being shown in elevation.
Figure 11:
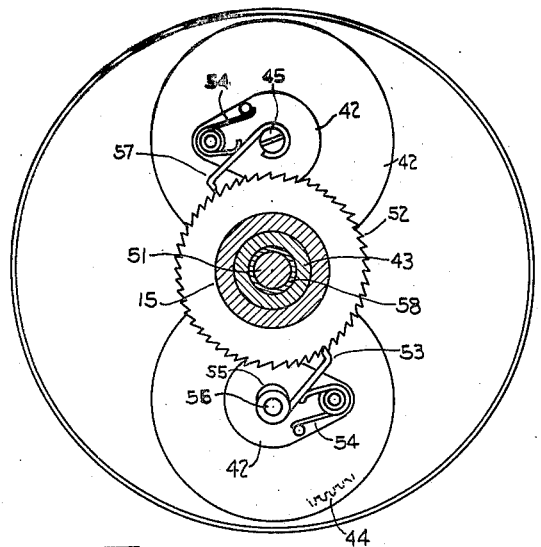
Figure 11 is a fragmentary detail in section, taken approximately on line 11—11 of Figures 2 and 12, looking in the directions indicated by the arrows.
Figure 12:
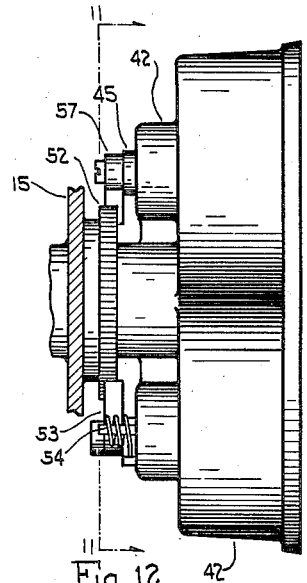
Figure 12 is a side elevation of the parts shown in Figure 11.
Figure 13:
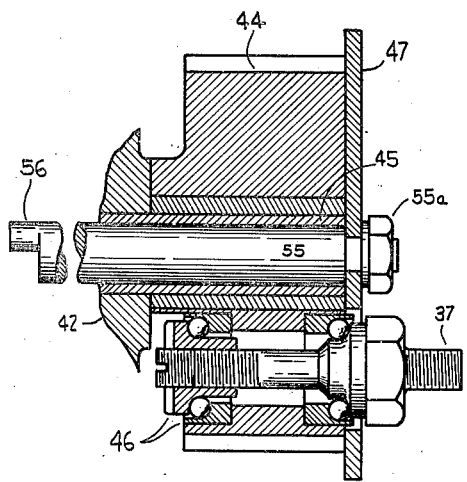
Figure 13 is a fragmentary detail in vertical section, taken approximately on line 13—13 of Figure 1, looking in the direction indicated by the arrows; and, Figure 14 is an elevation of the right-hand side of the parts shown in Figure 13.
Figure 14:
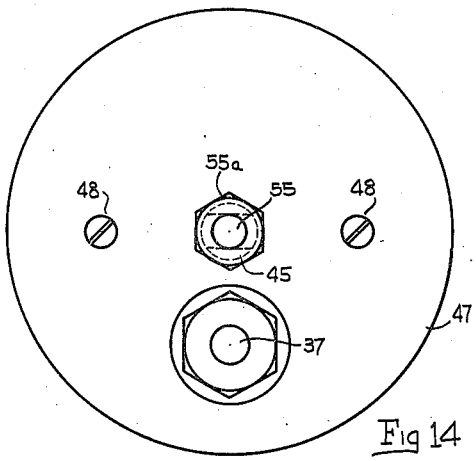

Adjacent the rearward portion of the gears 44 is disposed a toothed ring 52 rigidly carried by a portion of the main housing 15. One end of a pawl 53 is disposed in engagement with the ring 52. A spring 54 carried by the housing 42 maintains the pawl 53 in engagement with the teeth on the ring 52. One of the shafts 45 is hollow as shown by the lower of the two shafts 45 in Figure 2. Disposed through the hollow shaft 45 is a second shaft 55 secured to the face plate 47 by a nut 55a. The shaft 55 will rotate with the face plate 47 and the gear 44 while both the solid and the hollow shafts 45 are stationary with relation to the gears 44. The inner end of the shaft 55 is provided with an eccentric 56 which contacts the base of the pawl 53 on each revolution of the shaft 55. The pawl 53 being in engagement with the rigid ring 52, the housing 42 together with the gears 44 and all the parts carried thereby are moved the distance of one tooth on the ring 52 in a direction clockwise of Figure 11. A check pawl 57 is carried by the solid shaft 45 in the opposite gear 44 and serves to prevent return movement of the housing 42 and the parts therein contained. Appropriate bushings 58 are provided in the extension 43 of the housing 42 to carry the main shaft 51.

The action of the gears is as follows:
Rotation of the main shaft 51 drives the pinion 50 which rotates both gears 44. The stub shafts 37 travel in circles about the axes of the shafts 45 carrying the container gripping assembly heretofore described. At each revolution the shaft 55 forces the pawl 53 against the ring 52 and the housing 42 is moved the distance of one tooth on the ring 52. When the housing 42 has made a complete circle the parts are again in the starting position.

The main shaft 51 is operated from a pulley 59 loosely mounted near the end thereof. Adjacent the pulley 59 is an idler plate 60 which may be made of fibre, composition or metal and which is loosely mounted on the shaft 51. Adjacent the plate 60 is a driven plate 61 of less diameter than the plate 60. The driven plate 61 is keyed to the shaft 51. A spring 62 is disposed against the pulley 59 and a nut 63 on the end of the shaft 51 maintains the spring 62 under compression. This forces the pulley 59 against the idler plate 60 which in turn is forced against the driven plate 61 so that a friction drive is provided. The pressure of the pulley 59 against the plates 60 and 61 can be varied by the nut 63.

Adjacent the driven plate 61 but not connected thereto is a plate 64 rigidly secured to the extension or quill 43 of the housing 42. The plate 64 is provided with a notch 65 in its periphery. Adjacent the plate 64 is disposed a second plate 66 of irregular shape having an extension 67. The extension 67 extends a short distance past the plate 64 and is provided with a curved edge 68 which follows the periphery of the plate 64. The plate 66 is loosely mounted on the quill 43 and is secured to the plate 64 by a spring 70 having one end connected to a pin 71 on the plate 66 and its opposite end connected to a pin 72 on the plate 64. When the plate 64 is rotated the tension of the spring 70 will cause the plate 66 to rotate. The extension 67 lies adjacent the slot 65 as shown in Figure 4 when the device is operating. When the device is at rest the extension 67 lies on one side of the notch 65 as shown in Figure 3.

A D-shaped stop pin 73 is carried by an arm 74 which is held under tension against the periphery of the plate 64 or the plate 66 by a spring 75, as pointed out in the cycle of operation below. The arm 74 is carried on a shaft 76 secured to the housing 15. The idler plate 60 is provided with opposite stops 77 against which the pin 73 is adapted to ride as hereinafter described. The shaft 76 is connected through links 78 to a second shaft 79 carried in a frame 80 on the housing 15 and a handle 81 is provided to operate the parts as hereinafter described. Carried by the shaft 76 is an arm 82 having an adjustable finger 83 to operate a switch 84 to which is connected wires 85 which supply current to an electric motor 86 which operates the pulley 59 through the medium of a belt 87.

The motor 86 is mounted on a support 88 which is secured by bolts 89 to the housing 15 on one side, and adjustable bolts 90 on the other side to vary the position of the motor 86 to adjust the tension of the belt 87. A face plate 91, provided with openings for the face plates 47, is provided on the housing 42 to close the circular opening 41 of the housing 15. A rear wall 92 is provided to close the rear portion of the housing 15.

A cycle of operation of the apparatus is as follows:

The desired ingredients of the beverage are placed in the container 23. The cover 21 is applied and the handle 35 is operated downwardly to separate the extensions 18 and 26, and the container 23 is placed on the boss 25 and is held in position by the springs 28 upon release of the handle 35. The handle 81 is then operated and the shaft 76 is rocked. The arms 82 and 74 are moved downward. As the arm 74 is moved downward the pin 73 is removed from the notch 65 in the plate 64 and to a point beyond the curved edge 68 of the extension 67 on the plate 66. When the pin 73 clears the edge 68 the tension of the spring 70 rotates the plate 66 to the position shown in Figure 4. As the pin 73 is moved it moves from the path of movement of the stop 77 on the plate 60 to free the plate 60.

Synchronously, the switch 84 is closed by the finger 83 and the motor 86 set in motion. When the switch 84 is closed the handle 81 is released and the spring 75 operates to draw the arms 74 and 82 upward. The pin 73 now rides against the edge 68 of the extension 67 so that the plate 64 is free to turn and the arm 82 is not withdrawn sufficiently to permit disengagement of the switch 84.

The belt 87 drives the pulley 59 which operates the main shaft 51 through the clutch plates 60 and 61. As the shaft 51 is rotated the gears 44 are rotated and the stub shafts 37 agitate the plates 16 and 17 with the container 23 as heretofore described. As the rotation of the gears 44 is continued the housing 42 with the gears 44 and the plates 64 and 66 is rotated step by step by the action of the pawl 53 on the ring 52 as heretofore described. It follows, therefore, that the container 23 and its contents travel in a cycloidal path.

When the plates 64 and 66 begin to move with the housing 42 the pin 73 rides on the edge 68 of the extension 67. When the extension 67 moves past the pin 73 the pin 73 rides on the edge of the plate 64. Near the end of the cycle the extension 67 strikes the pin 73 and the plate 66 is held from further rotation and the tension of the spring 70 is increased. As the plate 64 continues the relation of the plates 64 and 66 change from the position shown in Figure 4 to the position shown in Figure 3. When the plates 64 and 66 reach the position shown in Figure 3 the pin 73 falls into the notch 65 under the influence of the spring 75. As the pin 73 moves into the notch 65 the arms 74 and 82 move upward, and the switch 84 is opened which stops the motor 86.

When one or the other of the stops 77 on the idler plate 60 reaches the pin 73 the pin 73 will be in the path of movement of one stop 77, thus stopping the plate 60 and through the friction between the plates 60 and 61 stop the shaft 51 and all of the mechanism operated thereby. A complete cycle having been made by the casing 42, the container 23 will again be in a vertical position and upon operation of the handle 35 may be removed from the gripping means and the contents extracted or poured therefrom. The apparatus is then ready to repeat the cycle of operation.

Having thus fully described the invention, what is claimed as new and desired to be secured by Letters Patent is:

1. A holding device for a beverage mixing apparatus comprising a pair of complementary gripping members, means for producing a tension between the gripping members, a rack on one gripping member, a rockable shaft on the other gripping member, a pinion secured on the shaft in mesh with the rack and means for rocking the shaft.

2. A holding device for a beverage mixing apparatus comprising a plate having an extension at one end, a second plate having a spring extension on one end thereof, said plates being disposed in slidable relation to each other, means for producing a tension between the plates and means for overcoming the tension.

3. A holding device for a beverage mixing apparatus comprising a plate having an extension at one end, a boss on the extension, a second plate having a spring extension on one end thereof and provided with a recess, said plates being disposed in slidable relation to each other, means for producing a tension between the plates and means for overcoming the tension.

4. In a beverage mixing device comprising a holder for a beverage container revoluble in a substantially vertical plane and adapted to retain a cover on said container while in its grasp, the combination of means for revolving said holder, and mechanism operable synchronously with said means for automatically stopping the revolution of said holder whenever it reaches a position such that any container grasped thereby is in a substantially vertical position with its cover uppermost.

5. A combination such as defined in claim 4 in which said means comprises a power-driven revoluble member and a friction coupling for transmitting motion from said member to said holder and in which said mechanism comprises a movable element adapted to positively arrest further movement of said holder at a predetermined point after any one complete revolution thereof.

6. In a beverage mixing device comprising a holder for a beverage container revoluble in a substantially vertical plane and adapted to retain a cover on any container while in its grasp, the combination of power operated means for revolving said holder, and mechanism operable synchronously with said means for disconnecting the power whenever said holder reaches a position such that any container grasped thereby is in a substantially vertical position with its cover uppermost.

7. In a beverage mixing device comprising a holder for a beverage container revoluble in a substantially vertical plane and adapted to retain a cover on said container while in its grasp, the combination of electrically driven motor means for revolving said holder, a circuit breaker in the current-supplying circuit therefor, and mechanism for automatically opening said circuit breaker upon the completion of any one revolution of said holder.

8. In a beverage mixing device comprising a holder adapted to grasp an elongated container, which said holder is revoluble in a substantially vertical plane, the combination of electrically driven motor means for revolving said holder, and mechanism for automatically opening the supply circuit for said motor means upon the completion of any one revolution of said holder, said mechanism being adapted to also simultaneously arrest positively any further rotation of said holder whenever said supply circuit is opened.

9. In a beverage mixing device the combination of two members revoluble on parallel shafts, a clamping device adapted to hold an elongated liquid container in a position with its longitudinal axis extending transversely of said shafts pivoted to said members at points equidistant from their respective shaft axes, and means for rotating said members; whereby reciprocation of said container is thereby produced, together with mechanism for causing said members to revolve in orbits lying in one and the same vertical plane; whereby the angle of inclination of such container to the horizontal plane may be gradually varied as it is reciprocated.

10. In a beverage mixing device the combination of two members revoluble on parallel shafts, a clamping device adapted to hold an elongated liquid container in a position with its longitudinal axis extending transversely of said shafts pivoted to said members at points equidistant from their respective shaft axes, and means for rotating said members; whereby reciprocation of said container is thereby produced, together with mechanism for causing said members to revolve in orbits lying in one and the same vertical plane; whereby the angle of inclination of such container to the horizontal plane may be gradually varied as it is reciprocated, the speed of movement of said members in their respective orbits being much less than that of their rotation about their respective axes; whereby said container is slowly swung about as it is rapidly reciprocated.

11. In a beverage mixing device the combination of two members revoluble on parallel shafts, a clamping device adapted to hold an elongated liquid container in a position with its longitudinal axis extending transversely of said shafts pivoted to said members at points equidistant from their respective shaft axes, and means for rotating said members; whereby reciprocation of said container is thereby produced together with mechanism for causing said members to revolve in orbits lying in one and the same vertical plane, and apparatus cooperating with said mechanism for automatically stopping its motion once in each orbital revolution when the axis of such container shall have assumed a vertical position.

12. In a beverage mixing device the combination of a holder for an elongated liquid container pivotally supported at spaced apart points by two revoluble cranks of equal radii, a revoluble member in which the shafts of said cranks are journaled, means for rotating said cranks simultaneously in the same direction and at the same speed, a stationary ratchet wheel and a pawl carried by said revoluble member engaging said ratchet wheel and reciprocated by one of said crank shafts; whereby after each reciprocation of said holder caused by a complete revolution of said cranks it is swung on its axis through the angle resulting from one reciprocation of said pawl during which the latter engages a tooth of said ratchet wheel.

LOUIS W. G. FLYNT.